N. GABEL.
Cornstalk Cutter and Stripper.

No. 52,282. Patented Jan. 30, 1866.

Witnesses:
J. W. Mason
John P. Jacobs

Inventor:
Nelson Gabel
per J. L. Alexander atty

UNITED STATES PATENT OFFICE.

NELSON GABEL, OF PREBLE COUNTY, OHIO.

IMPROVEMENT IN CORNSTALK CUTTERS AND STRIPPERS.

Specification forming part of Letters Patent No. 52,282, dated January 30, 1866.

*To all whom it may concern:*

Be it known that I, NELSON GABEL, of Preble county, in the State of Ohio, have invented certain new and useful Improvements in Machines for Cutting and Stripping Cornstalks; and I hereby declare that the following is a true and exact description of the same, reference being had to the accompanying drawings, and to the letters of reference marked thereon.

Figure 1:
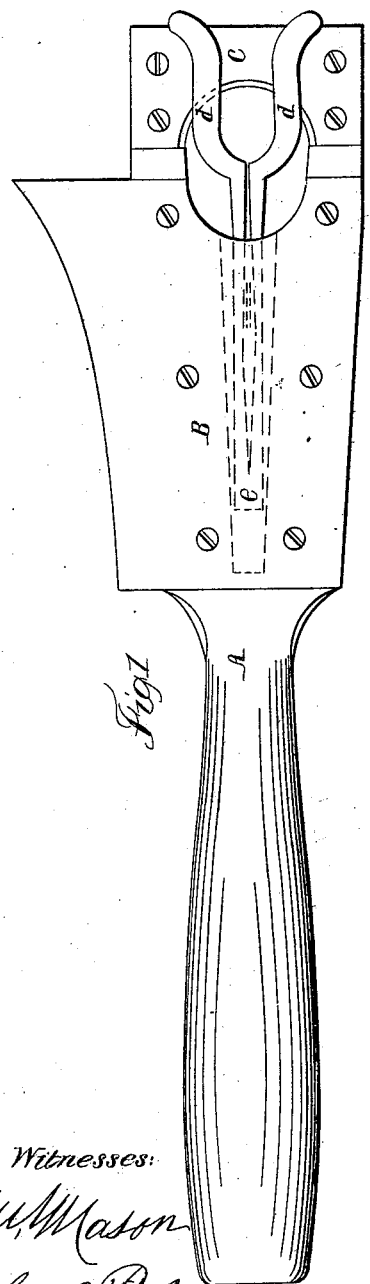
Figure 2:
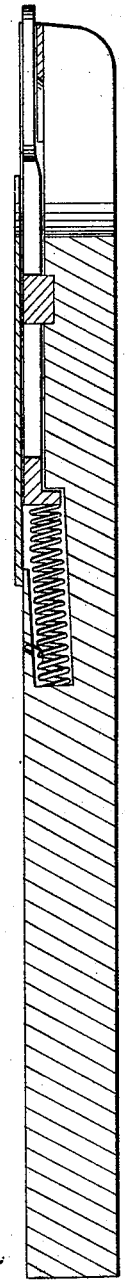

Figure 1 in the annexed drawings represents a plan view of my machine. Fig. 2 gives a longitudinal vertical section of the same.

Letter A, Fig. 1, designates the body of the machine, formed of wood. That portion of A which is designed for the handle is rounded, so as to be used without inconvenience to the operator. From the lower part of the handle the body A gradually widens until it reaches its lower end, and is made flat on its upper surface to receive the metal plate B, which is firmly secured to A by screws. The plate B has one of its edges flush with the side of A, while its opposite edge projects a suitable distance beyond the side of A and is ground into a concave cutting-edge. (See Fig. 1.) The lower end of A is forked, the forks being connected together by the plate C, which is also concave at its inner side and ground to a cutting-edge. Passing under the plate B, and resting in an excavation made in the upper surface of body A, are the two springs *d*, which are united to the solid metal block *e*, and extend downward a little beyond the outer edge of plate C. The lower ends of the springs *d* are made to diverge, so as to leave a U-shaped space between them.

It will be observed that the lower edge of the plate B is cut in a concave form corresponding in size with the cutting-edge of plate C, so as to leave room for the springs *d* to separate sufficiently far at their point of divergence to receive a full-sized stalk of corn. Underneath the block *e* is placed the spiral spring *g*. The object of the spring *e* is to admit of the spring *d* receding when the stalk of corn is too large to be embraced between the concave edge of plate C and the point of divergence of the two springs *d d* when the springs are in the position represented in Fig. 1.

In operating my machine the first step is to cut off the top of the stalk with the cutting-edge of B, then place the machine at the top of the truncated stalk, so that it will enter the space between the springs *d*. This being done, a rapid motion downward will strip the blades from the stalk as far down as is required. The operator will now draw the machine toward him, and the stalk will be severed near the ground by the cutting-edge of plate C, and the whole process be accomplished.

Having thus described my machine, what I claim, and desire to secure by Letters Patent, is—

The plate B, in combination with the springs *d d*, the plate C, and the spiral spring *e*, the whole constructed and operating as and for the purpose herein set forth.

NELSON GABEL.

Witnesses:
LUCIAN GABEL,
WM. BELL.